United States Patent [19]
Goldschmidt et al.

[11] 3,982,160
[45] Sept. 21, 1976

[54] SYSTEM FOR CONTROLLING TENSION OF MAGNETIC TAPE

[75] Inventors: Arthur Marvin Goldschmidt, Moorestown; William Arnold Dischert, Jobstown; Joseph Richard West, Haddonfield, all of N.J.

[73] Assignee: RCA Corporation, New York, N.Y.

[22] Filed: Mar. 12, 1975

[21] Appl. No.: 557,534

[30] Foreign Application Priority Data
Mar. 14, 1974 United Kingdom............... 11430/74

[52] U.S. Cl..................................... 318/7; 242/186
[51] Int. Cl.²........................................ B65H 59/38
[58] Field of Search.......................... 318/7; 242/186

[56] References Cited
UNITED STATES PATENTS

| | | | |
|---|---|---|---|
| 3,673,473 | 6/1972 | Werner................................. | 318/7 |
| 3,809,335 | 5/1974 | Mantey............................... | 318/7 X |
| 3,910,527 | 10/1975 | Buhler................................. | 318/7 X |

*Primary Examiner*—B. Dobeck
*Attorney, Agent, or Firm*—Eugene M. Whitacre

[57] ABSTRACT

A tape tension control system is provided which controls the rotation of two tape reels to maintain substantially constant tension of the tape over its full length for all operational modes. The device utilizes inputs from two reel tachometers and a tape counter-roller for controlling the torque applied to each reel by AC induction motors. The tape counter-roller effectively measures the linear velocity of the tape which is driven by a capstan and the tachometers measure the rotational velocity of each reel. Appropriate logic circuitry, supplied with these velocity readings, enables the system effectively to sense tape diameter on each reel for providing the necessary torque to each reel to maintain uniform tape tension. This system provides for rapid start of the reels to allow for fast lock-in of the capstan and also controlled starts in fast modes such as rewind and fast-forward to prevent high stresses on the tape. A memory capability is provided for storing the diameters of the tape reels when the machine is placed in a stop mode. In addition, during the loading operation in the thread mode, proper diameter information is fed to the reel memories upon a minimal rotation of the tape reels.

16 Claims, 4 Drawing Figures

SYSTEM FOR CONTROLLING TENSION OF MAGNETIC TAPE

This invention relates to a system for controlling tension on a magnetic tape in a magnetic recording and reproducing apparatus and, more specifically, to a system for automatically maintaining substantially constant tension on the magnetic tape under conditions of starting, fast running (forward and reverse) and normal record/play operation.

One type of magnetic tape tension controlling device which has been used in television broadcast type video tape recorders includes a swingable tension or idler arm which is equipped at one end with a pin in pressure contact with a running magnetic tape. A turning force on the tension arm, resulting from variation in the tension of the magnetic tape, is transferred to a drive mechanism for a tape supply reel to control the torque applied to the supply reel. Variation of the tape tension is mechanically detected in terms of an angular deviation of the arm. This method of tape tension control not only involves a complicated mechanical construction, but also exhibits the characteristic that the degree of tape wrap around the idler varies continuously, thereby creating a tendency to produce oscillation of the tape.

Vacuum controlled bins or buffers represent another known magnetic tape tension controlling system. Such systems usually employ two vacuum bins with associated photoelectric sensor. These sensors divide a vacuum zone into several segments such that when the bight of a tape loop is below or above a particular sensor, a tape storage reel motor is energized to withdraw from or feed tape to the vacuum bin in order to control tension in the tape. A vacuum bin arrangement has several drawbacks including high space requirements for the hardware involved. That is, the vacuum bins and pumps for creating the necessary vacuum occupy a large volume. In addition, the sensitivity of the vacuum bin system is limited by the number of photoelectric sensing means employed. Furthermore, the effectiveness of control in such a system depends on the condition of the magnetic tape employed, the vacuum apparatus having a tendency to tear magnetic tape when small nicks or cuts are present along a tape edge.

In accordance with the present invention, a system is provided for controlling the tension of a magnetic tape in a magnetic recording/reproducing apparatus to automatically maintain the tension of the magnetic tape substantially constant. Such a system utilizes one motor on the supply reel and one motor on the takeup reel. A tachometer or rotational velocity sensor is associated with each motor. A further rotational velocity sensor is associated with a fixed diameter tape driver or roller for measuring the linear velocity of tape travel. Signal processing and logic circuitry is provided for receiving the outputs from the velocity sensors to determine the diameter of tape on the reels. The relative tape diameter information is converted to an appropriate torque signal for each motor to maintain substantially constant tension on the magnetic tape. Means are also provided for effecting rapid start of the reels to allow fast lock-in of the capstan driving member along with controlled starting in the recorder fast modes (i.e., fast-forward and rewind) to prevent high stresses on the magnetic tape. A memory capability is provided for storing the last diameter of the reels when the machine is made to stop and start. When the machine is in the thread mode, i.e., during the loading operation, the memory capability is utilized to provide the machine with the proper diameter information upon a minimal rotation of the tape reels.

Further features of this invention will become apparent from a consideration of the accompanying specification and drawing in which.

Figure 1:
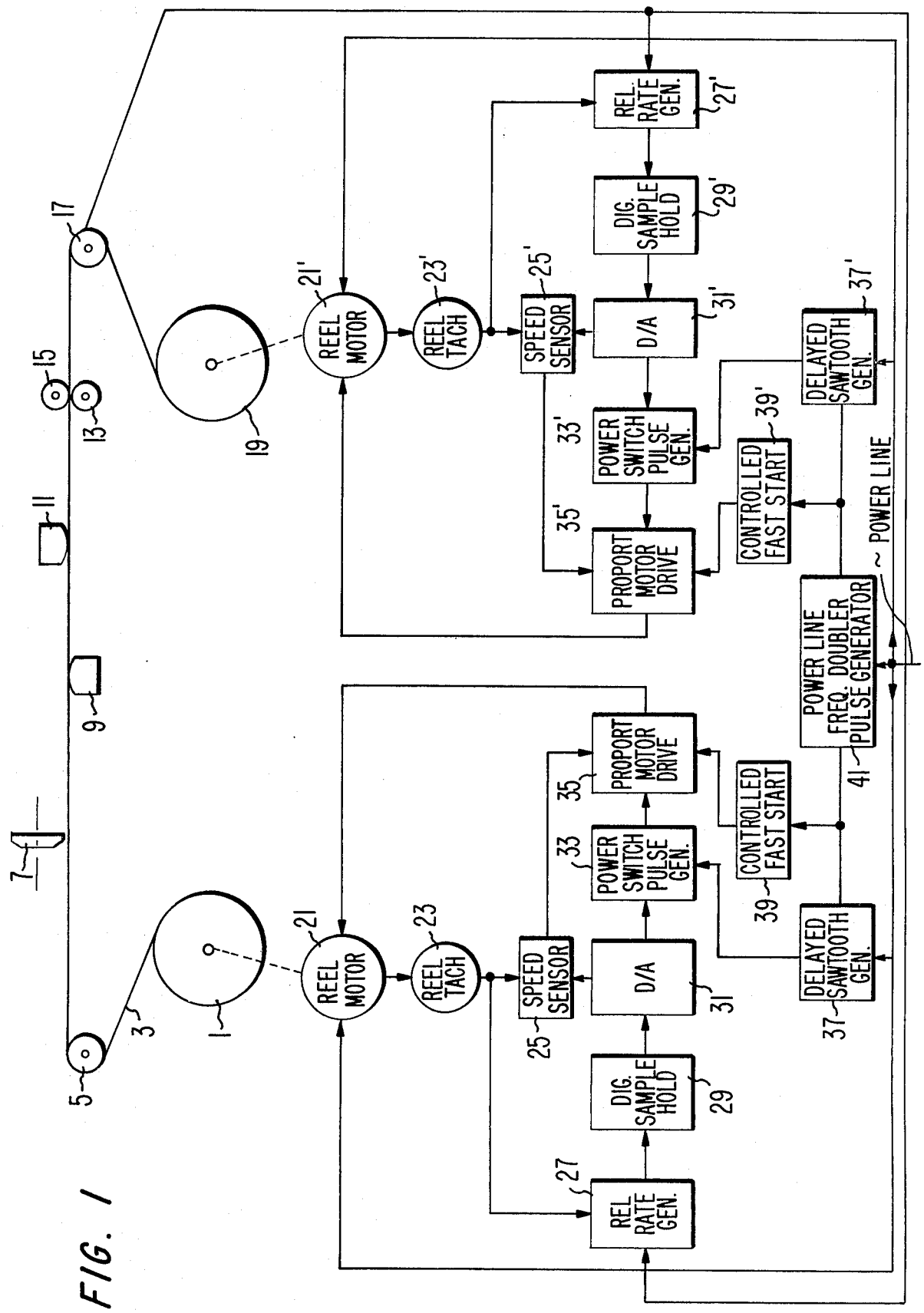
FIG. 1 is a diagrammatic representation of one embodiment of a tape tension control system in accordance with the present invention.

Referring to FIG. 1, the illustrated magnetic video tape recorder tension control system includes a magnetic tape transport assembly comprising a tape capstan 13 which, in conjunction with a pressure roller 15, propels the magnetic tape 3 past a video recording and playback headwheel 7, an audio erase head 9 and an audio record/play head 11. The magnetic tape 3 is supplied from supply reel 1 and collected by takeup reel 19 after being guided by roller 5 and a further turn-around roller associated with a tape tachometer 17.

Supply reel motor 21, of the AC induction type, is coupled to supply reel 1 for providing appropriate torque to maintain substantially constant tape tension during normal play and fast-forward operations, to provide full driving torque during the tape rewind operation and to provide forward drive during start-up. A supply reel tachometer apparatus 23 is coupled to reel motor 21 for measuring the rotational velocity of supply reel 1. This velocity is determined, for example, by an optical disc and pickup arrangement, although other types of sensing means are applicable. The output of reel tach 23 is supplied to a speed sensor 25 arranged to sense operating mode and relative rate generator 27. Relative rate generator 27 is also supplied with an output from tape tachometer 17. A relative rate output from generator 27 is coupled to a digital sample and hold circuit 29. Sample and hold circuit 29 is coupled to a digital-to-analog converter 31 whose output is supplied to a power switching pulse generator 33 and to speed sensor unit 25. Alternating power line current (e.g., 60 Hertz) is supplied to a power line frequency doubler and pulse generator 41. One side of the power line is also coupled to one input of reel motor 21. The output of frequency doubler 41 is supplied to a delayed sawtooth generator 37 and to a controlled fast-start network 39. The output of delayed sawtooth generator 37 is coupled to a second input of power switching pulse network 33, the output of which is coupled to a proportional motor drive unit 35. The output of proportional motor drive unit 35 is coupled to a second input of reel motor 21 for controlling the amount of torque applied to tape reel 1 to maintain substantially constant tension in magnetic tape 3. As can be seen from FIG. 1, a similar tape tension servo system as just described in connection with supply reel 1 is provided for takeup reel 19. Corresponding parts of the takeup reel servo are labelled with like reference numbers followed by a prime (') symbol.

In the system of FIG. 1, the combined action of capstan 13 and pressure roller 15 effects the passage of magnetic tape 3 from supply reel 1, around guide roller 5, past video record and playback wheel 7, and around the roller associated with tape tachometer 17 onto takeup reel 19.

Figure 2:
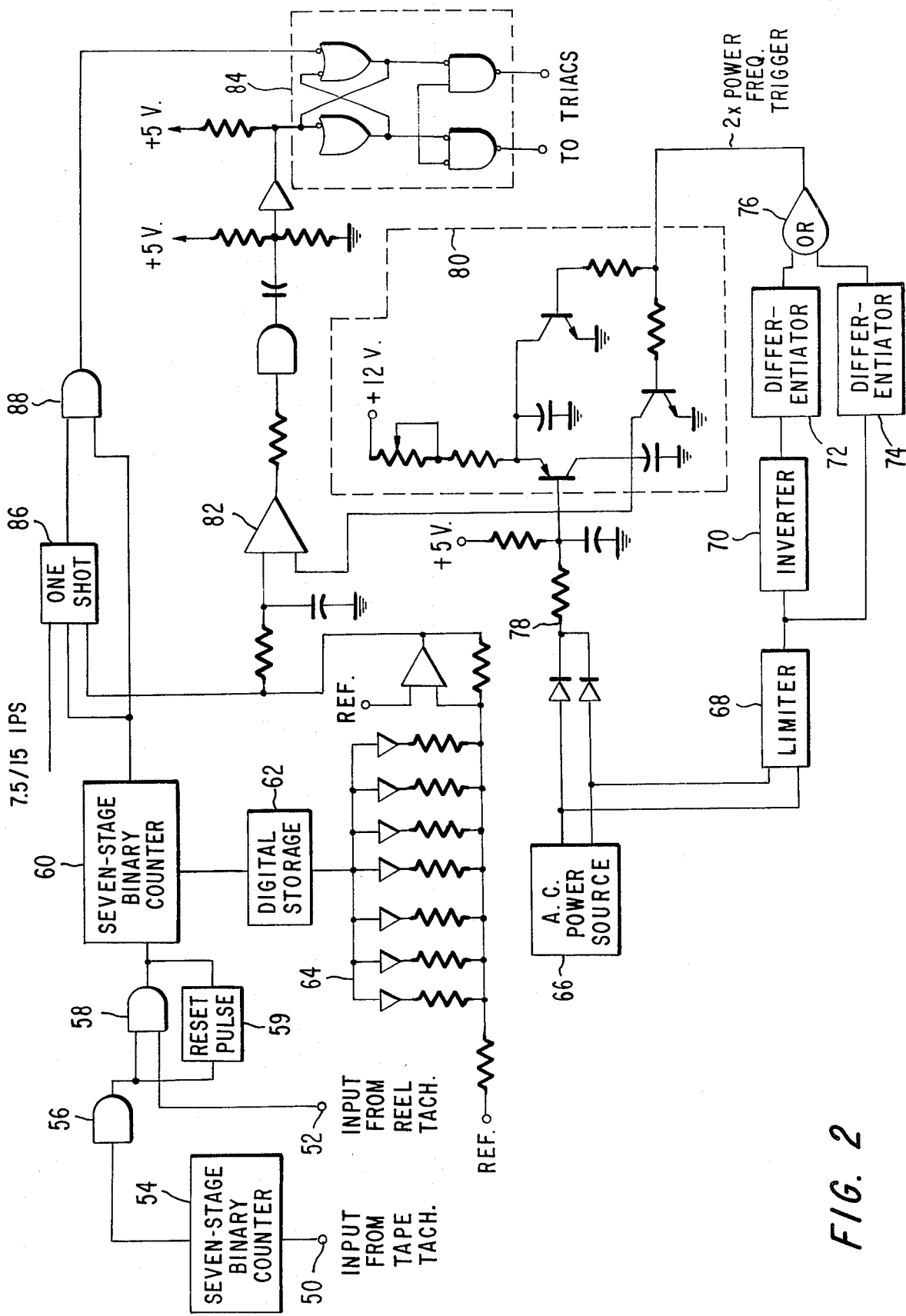
FIG. 2 is a more detailed schematic representation of a portion of the servo system shown in diagrammatic form in FIG. 1.

The turn around roller associated with tape tachometer 17 is driven directly by the tape 3 substantially free of slippage. Therefore, tape tachometer 17 may be considered as measuring the linear velocity of magnetic tape 3. A resulting pulse train output developed by tape tachometer 17 is fed to one input of relative rate generator 27. Generator 27 includes a seven stage binary counter (FIG. 2, 54). The output pulses of the tape tachometer 17 are divided in this seven-stage counter 54 to produce a gate which is relatively positive up to a count of 127 and relatively negative for an additional count of 1. The gate signal is utilized for determining the relative rates of supply reel 1 and takeup reel 19 with respect to a reference datum (the tape speed). To this end, output pulses from supply reel tachometer 23 are also supplied to the relative rate generator 27. These pulses are combined with the output of the seven-stage tape counter 54 in an AND gate 58 and a resulting output is fed to a second seven-stage binary counter (60 of FIG. 2). The output of seven-stage counter 60 is a measure of the relative rotational rates measured by tape tachometer 17 and supply reel tachometer 23. This information may be utilized as an indirect measurement of the diameter of tape on the reel at any instant. The output of counter 60 is strobed into digital storage comprised of sample and hold circuit 29 (strobed memory 62 in FIG. 2) after which the relative rate counter network 60 is reset to zero prior to the time another tape tach gate is produced at gate 56 to repeat the pulse counting operation as a function of tape velocity. This reset operation is facilitated by reset pulses produced over differentiating network 59 shown in FIG. 2.

The output of the sample and hold circuit 29 is fed to digital-to-analog converter 31 which is illustrated in detail in 64 of FIG. 2. Digital-to-analog converter 31 converts the digital information stored in sample and hold network 29 to an analog DC output level which is compared with a reference waveform as will be explained below.

The reference waveform is derived from the power line voltage. To this end, the power line input (e.g., 60 Hertz sinusoidal waveform) is coupled to power line frequency doubler and pulse generator unit 41. Here, the power line input (e.g., 115 volts AC), unit 66 of FIG. 2, is transformed down to approximately 12 volts AC, center tapped, and fed to a limiter circuit 68 (FIG. 2) in which the 60 Hertz sine wave is transformed to a time coincident square wave output. The square wave output from the limiter circuit 68 is inverted by an inverter 70 (FIG. 2) and both inverted and non-inverted signals are differentiated by appropriate networks 72, 74. The resulting pulses are combined in OR gate 76 to form trains of pulses at twice the power line frequency with crossovers substantially coincident with the zero crossovers of the power line input.

The resulting output of power line frequency doubler and pulse generator 41 is then supplied to a delayed sawtooth generator network 37. This variable delay circuit 37, network 80 of FIG. 2, generates a recurring ramp voltage waveform which saturates at the top. The beginning of each ramp is timed relative to the power line crossovers but is delayed as shown in waveform A of FIG. 3. A line voltage compensator network 78 (FIG. 2), is used to increase or decrease the delay of the sawtooth generated by network 37 as the line voltage increases or decreases to compensate motor torque for such changes in line voltage. Details of the sawtooth generator network are set forth in a concurrently filed application Ser. No. 557,533, of A. M. Goldschmidt.

Figure 3:
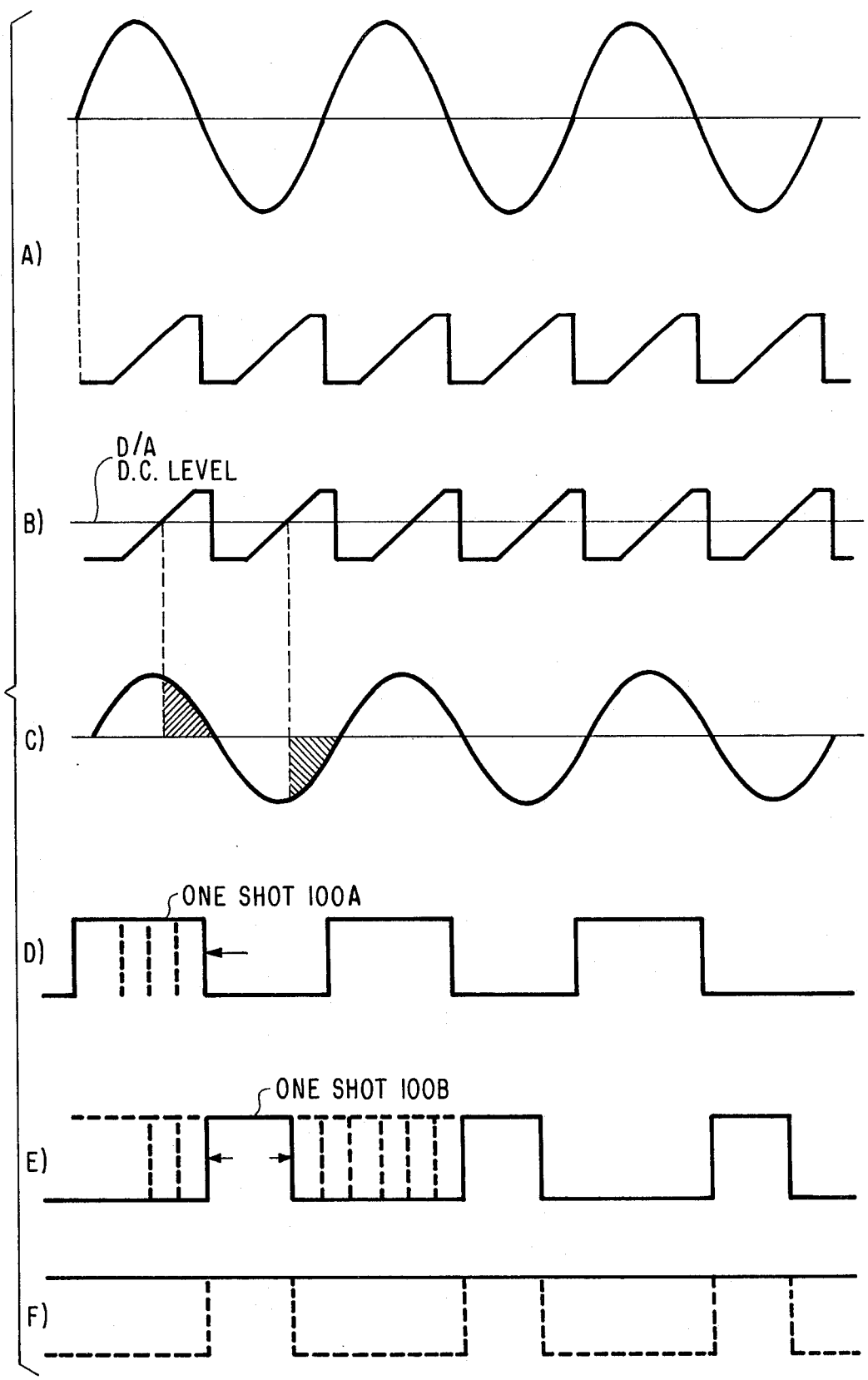
FIG. 3 is a series of waveforms of signals in the system and circuit illustrated in FIGS. 1 and 2.

The reference sawtooth waveform generated by delayed sawtooth unit 37 is applied to one input of the power switching pulse generator 33 where it is used as a reference for comparison with the DC analog output level of the D/A converter unit 31, as shown in waveform B of FIG. 3.

The intersection of the D/A output signal and the delayed sawtooth ramp, as shown in waveform B of FIG. 3, will vary in time as a function of the relative velocity of supply reel 1 with respect to tape 3. As the tape unwinds from supply reel 1, supply reel 1 increases in rotational velocity. The output of the reel tachometer 23 will be higher which, in turn, will result in a higher DC level at the output of the D/A converter 31. Such a higher DC output level will intersect the ramp of the delayed sawtooth signal at a higher point which is representative of a later point in time as shown in waveform B' of FIG. 3. The intersection of the D/A DC output signal and the delayed sawtooth ramp signal will activate gating signal amplifier circuit 82 in FIG. 2. The gating signal is used to produce an output signal which is fed to a bidirectional switch and proportional motor drive unit 35 for driving either one of two conventional triac motor driving circuits coupled to the supply reel motor 21. One triac circuit is used for the clockwise (forward) direction and the other for the counterclockwise (reverse) direction. One or the other of the triac circuits is selected according to mode switching signals coupled to the bidirectional switch 84 of FIG. 2.

The control signal which is supplied to each triac circuit depends upon the intersection point of the output signal of the D/A converter 31 and the delayed sawtooth waveform generator 37 as depicted in waveform B of FIG. 3. As shown in waveform C of FIG. 3, the intersection of these two waveforms will determine the percent of the line voltage waveform which is applied by the triac circuits to the supply reel motor 21 for controlling the amount of hold-back torque applied for effecting constant tension in the magnetic tape 3. It can be seen from waveforms B and C of FIG. 3 that as the rotational velocity of the supply reel 1 increases relative to the tape velocity, thereby causing a higher output from the D/A converter 31, the triac circuits will fire at a later time, thereby resulting in a lesser degree of hold-back torque being applied to the supply reel motor 21. Specifically, each triac circuit is coupled in series between one side of the AC line and one end of an individual one of the windings of a two-phase symmetrical torque reel motor 21. A phase shifting capacitor is coupled between the ends of the windings to which the triacs are connected. In the case of the supply reel, the AC input is phased so as to supply hold-back torque. That is, when the tape 3 is driven in the forward direction by capstan 13, supply reel 1 rotates in a counterclockwise direction, but reel motor 21 is energized to rotate in the clockwise direction, thereby applying a hold-back torque to the tape 3 to maintain the desired tension. In opposite fashion, the AC input with respect to takeup reel 19 is phased so as to provide pull-in torque. That is, when the tape 3 is driven in the forward direction by capstan 13, takeup reel 19 rotates in a counterclockwise direction and reel motor 21' is energized in the same direction thereby applying a pull-in torque to the tape 3 to achieve the desired tension.

In order to achieve rapid lock-in and synchronization of the magnetic tape 3, when the video tape recorder first is switched into the forward run mode, the proportional motor drive and switching network 35 is energized so as to apply that sense of full torque to the supply reel motor 23 which drives supply reel 1 in the forward (counterclockwise) direction. In like fashion, full torque is applied to takeup reel 19. When the reel speed sensor unit 25 determines that the linear speed of magnetic tape 3 is up to the sufficient tape travel speed for synchronization, taking into account the diameter of tape on each reel, proportional motor drive unit 35 is reset to provide energizing potential corresponding to the motor direction which provides hold-back torque to reel 1 and normal pull-in torque to reel 19. This operation for achieving rapid synchronization is accomplished in the following fashion.

For the case where the desired tape velocity is to be 7½ inches per second, the output of D/A converter 31 is fed unaltered to speed sensor 25, whereas when the tape velocity is to be 15 inches per second, the output of D/A converter 31 is divided by two in speed sensor 25. The reel tachometer output signal from counter 60 of FIG. 2, (e.g., a negative-going edge) triggers a ramp generator which is compared to the divided or undivided output of D/A 31 to produce a positive pulse whose width is a function of the tape speed (7.5 vs. 15 ips), the 7.5 ips producing one-half the pulse width of the 15 ips. This positive pulse is coupled to one input of NAND gate 88, the second input of which is provided by the output of supply reel tach 23.

When the time between adjacent pulses from the reel tachometer 23 is sufficiently fast, both NAND gate inputs will be high simultaneously, thereby producing a low at the output of NAND gate 88 which, in turn, will reset the proportional motor drive unit 35 to provide hold-back torque via reel motor 21 to tape reel 1, thereby terminating the start-up phase operation.

Under conditions of fast wind or rewind, capstan 13 is disengaged from the tape and maximum torque is applied to the motor associated with the reel onto which tape is being added, i.e., supply reel 1 during rewind and takeup reel 19 during fast-forward wind. If this full torque were applied initially, a large stress would be applied to magnetic tape 3. To prevent this, when fast wind or rewind is desired, torque is increased gradually by initially controlling the triac turn-on time for a low torque and gradually increasing this time until full torque is achieved. This is accomplished by controlling the gating of high frequency "railing" pulses. The railing pulses are provided, for example, at a frequency in the range of 30 to 40 KHz.

Figure 4:
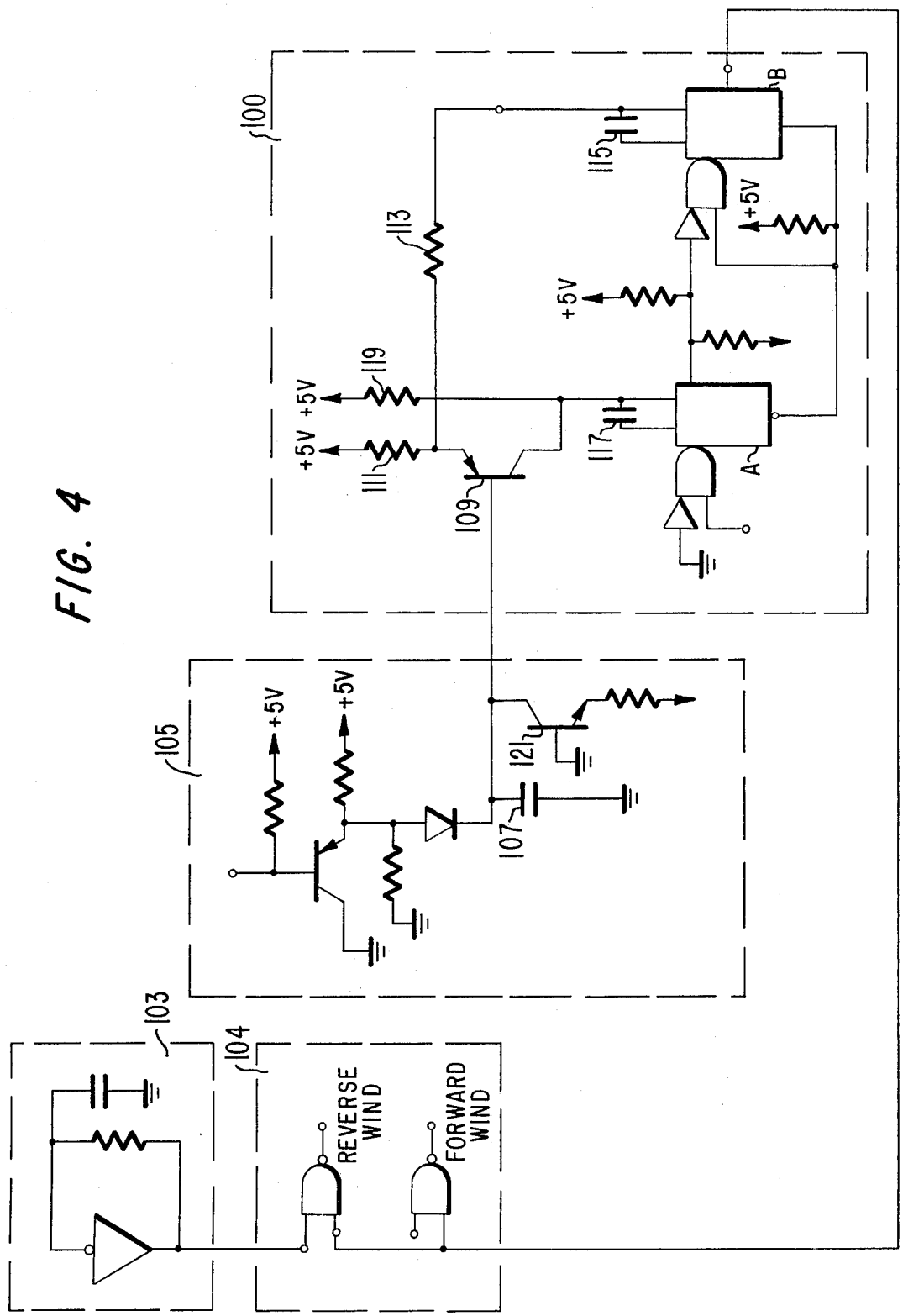
FIG. 4 is a schematic representation of a portion of the servo system for supplying full torque under conditions of fast-forward and/or rewind.

The gating of railing pulses is provided by a controlled fast-start network 39 shown in detail in FIG. 4. Network 39 consists of a pair of one-shot multivibrators 100, FIG. 4. The first of these multivibrators A is triggered by the output of power line frequency doubler 41 (e.g., pulses at 120 Hz) with the second multivibrator B being triggered at the end of the delay provided by the width of the output pulses produced by multivibrator A. The output of second multivibrator B is combined in a gating circuit 104 with the output of a relatively high frequency railing pulse oscillator 103 (FIG. 4).

In fast-start network 105 (FIG. 4) a capacitor 107 coupled to the base of a PNP transistor 109 is initially charged to a predetermined voltage (e.g., 3.5 volts). An emitter resistor 111 associated with transistor 109 is returned to a source of voltage (e.g., +5 volts). An additional resistor 113 is connected from the emitter of transistor 109 to a timing capacitor 115 of the second one-shot multivibrator 100B. The collector of transistor 109 is coupled to a timing capacitor 117 of the first one-shot multivibrator 100A. A further resistor 119 is coupled between the source of voltage (+5V) and capacitor 117.

The output pulses produced by the first one-shot 100A are wider than the pulses produced by the second one-shot 100B as shown in waveforms D and E of FIG. 3. When the machine is placed in either the fast wind or rewind modes, capacitor 107 slowly discharges towards ground, through constant current transistor 121, increasing the current supplied by transistor 109 to the first one-shot 100A. The output pulse width of one-shot 100A decreases slowly as shown diagrammatically in waveform D of FIG. 3. As the current in transistor 109 increases, the voltage at the emitter of 109 is decreasing, thereby increasing the width of output pulses produced by the second one-shot multivibrator 100B as shown diagrammatically in waveform E of FIG. 3. The effect is for the trailing edge of the pulses provided by the second one-shot 100B to remain initially fixed in time while their leading edge moves earlier in time as shown in waveform E. When the time interval of the first one-shot 100A no longer decreases, the trailing edge of the pulses provided by the second one-shot 100B will move later in time until ultimately its output remains at a positive DC level as shown in waveform F. This condition allows for a continuous train of railing pulses from high frequency oscillator 103 in FIG. 4 to be applied to the triac motor drive 35 (FIG. 1) via gates 104 for full motor torque.

When the machine is placed in a mode other than fast wind or rewind, capacitor 107 is rapidly recharged to its initial condition. While in the fast modes, the supplying reel, i.e., reel 1 in the wind mode and reel 19 in the rewind mode, has variable torque applied to control tension as a function of diameter as described in the normal run mode.

While the operation of the tape tension servo control system, as described above, has been limited to the supply reel 1 operation, it is to be understood that a like servo system exists for takeup reel 19, the operation of which is similar to that described above. It should be noted, however, that the energization of takeup reel motor 21' is under all conditions biased to drive takeup reel 19' in the normal "takeup" direction (i.e., counterclockwise as shown in FIG. 1). Thus, when the machine is operating in the normal "run" or rewind (fast) modes, takeup reel motor 21' exerts a pulling force on tape 3 so as to maintain a desired tension. However, when the machine is placed in the fast-forward wind mode, reel motor 21' will exert a full torque on tape 3.

Supply reel motor 21, on the other hand, in conjunction with its associated drive circuit 35 and switching pulse generator 33 is arranged to produce hold-back torque in the normal run and forward wind (fast-forward) modes of operation but is energized in the opposite sense during the start-up mode to provide appropriate drive to the tape 3. A suitable bidirectional drive system for the supply reel 1 is described, for example, at page 222 of the "SCR Manual, 4th Edition", published by General Electric Company. Only one triac need be used for the case where unidirectional control of the motor is required as in the case of the takeup reel 19.

When the machine is placed in a stop mode, the digital diameter information is stored in memory storage 62 (FIG. 2) to preclude random start-up. In like fashion, during the loading and threading operation, reel diameter information is supplied to the digital storage network upon rotation of the tape reels for approximately one revolution of the reel on which is stored the greater amount of tape. This operation provides the desired tape tension in relation to the quantity of tape on each reel at the time of threading.

It will be apparent that other modifications and variations of the described embodiment may be effected without departing from the scope or spirit of this invention as defined in the appended claims.

What is claimed is:

1. In a system for magnetically recording signals on a moving web, apparatus for maintaining tension in said web comprising:
   means for propelling said web along a path;
   a first reel for said web;
   a first motor associated with said first reel;
   a source of alternating energizing voltage for said first motor;
   first means for producing a first signal representative of the rotational velocity of said first reel;
   second means for producing a second signal representative of the linear velocity of said web;
   a first servo loop responsive to said first and second signals for controlling said reel comprising:
      means for supplying a periodically varying reference signal in timed relation with said alternating energizing voltage;
      signal rate control means coupled to said first and second means for generating an output signal representative of the rotational speed of said web reel in relation to the linear web speed; and
      control means responsive to said reference signal and said output signal of said signal rate control means for variably energizing said first motor to maintain substantially uniform tension in said moving web.

2. The system as defined in claim 1 wherein each of said first and second signal producing means comprises a digital counter and a tachometer, the output of said counting means associated with said first reel having a magnitude which varies as a function of the amount of said web occupying said reel.

3. The system as defined in claim 1 wherein said means for supplying a periodically varying reference signal provides a recurring sawtooth waveform having a beginning delayed in time with respect to zero axis crossovers of said alternating energizing voltage.

4. A system as defined in claim 1 wherein said signal rate control means comprises:
   a first digital counter for receiving output signals from said second signal producing means for establishing a counting interval therefrom;
   a second digital counter for counting output signals from said first signal producing means for the counting interval defined by said first digital counter;
   sampling means for periodically storing the signal count of said second digital counter; and
   digital-to-analog converter means coupled to said sampling means for producing a direct voltage representative of the magnitude of said stored signal count.

5. The system according to claim 4 wherein said control means includes a triac circuit responsive to said reference signal and said direct voltage for controlling energization of said motor by said source to vary torque applied by said motor to said reel, thereby substantially effecting uniform tension in said web.

6. The system according to claim 5 wherein said motor is of the AC induction type.

7. In a system for magnetically recording signals on a moving web, apparatus for maintaining tension in said web comprising in combination:
   means for propelling said web along a path;
   first and second reels for supplying said web to and receiving said web from said propelling means;
   first and second motors associated with said respective first and second reels;
   a source of alternating energizing voltage for said first and second motors;
   first means for producing a first signal representative of the rotational velocity of said first reel;
   second means for producing a second signal representative of the rotational velocity of said second reel;
   third means for producing a third signal representative of the linear velocity of said web;
   a first servo loop responsive to said first and third signals and a second servo loop responsive to said second and third signals for controlling said first and second reels respectively, said first and second servo loops comprising:
      means for supplying a periodically varying reference signal in timed relation with said alternating energizing voltage;
      first and second signal rate control means coupled respectively to said first and third means of said first servo loop and to said second and third means of said second servo loop for generating a first and second output signal representative of the rotational speed of said first and second reels respectively in relation to the linear web speed; and
      control means responsive to said reference signal and said output signals of said signal rate control means for variably energizing said first and second motors to maintain substantially uniform tension in said moving web.

8. The system according to claim 7 wherein each of said first, second and third signal producing means comprises a digital counter and a tachometer, the output of said counting means associated with said first and second reels having a magnitude which varies as a function of the amount of said web occupying said reels.

9. The system according to claim 7 wherein said means for supplying a periodically varying reference signal provides a recurring sawtooth waveform having a beginning delayed in time with respect to zero axis crossovers of said alternating energizing voltage.

10. A system according to claim 7 wherein said first and second signal rate control means comprise:

a first digital counting means for receiving output signals from said third signal producing means for establishing a counting interval therefrom;

a second digital counter for counting output signals from said second signal producing means and a third digital counter for counting output signals from said third signal producing means respectively for the counting interval defined by said first digital counting means;

sampling means for periodically storing the signal counts of said second and third digital counters respectively; and digital-to-analog converter means coupled to each of said sampling means for producing direct voltages representative of the magnitudes of said stored signal counts.

11. A system according to claim 10 wherein each said control means includes a triac circuit responsive to a respective reference signal and direct voltage for controlling the energization of said first and second motors respectively by said source to vary torque applied by each said motor to said first and second reels respectively, thereby effecting substantially uniform tension in said web.

12. The system according to claim 7 wherein said first and second motors are of the AC induction type.

13. A system according to claim 7 wherein in a forward-run mode, said control means associated with said first motor is arranged such that said first motor provides hold-back torque to said first reel and said control means associated with said second motor is arranged such that said second motor provides pull-in torque to said second reel for effecting substantially uniform tension in said web.

14. A system according to claim 7 wherein in a fast-wind mode said means for propelling said web along a path is disengaged from said web, said first motor provides hold-back torque to said first reel and said second motor provides forward torque to said second reel for effecting fast-wind of the web.

15. A system according to claim 7 wherein in a rewind mode said means for propelling said web along a path is disengaged from said web and wherein said first motor provides forward drive torque to said first reel and said second motor provides hold-back torque to said second reel for effecting rewind of said web.

16. A system according to claim 7 wherein in a start-up mode said first motor provides torque to said first reel in the forward payout direction of said web and said second motor provides forward torque to said second reel.

* * * * *